United States Patent Office 2,982,660
Patented May 2, 1961

2,982,660

PREVENTION OF CASING STICKING TO MEATS

George E. Brissey, Chicago, and Rufus C. Hill, Jr., Park Forest, Ill., assignors to Swift & Company, Chicago, Ill., a corporation of Illinois No Drawing. Filed Apr. 19, 1957, Ser. No. 653,762

3 Claims. (Cl. 99—174)

This invention relates to a method for the prevention of the adherence of artificial casings to meat cuts. More particularly, primal meat products are coated with acetylated monoglycerides and diglycerides as a means for preventing establishment of a bond between the meat surface and casing.

In production of a number of processed primal meat products, the meat is enclosed in a casing and subjected to smoking and heating. Where the meat has a natural fat covering, little difficulty is commonly encountered in removing the casing from the meat. However, with the advent and increasing use of artificial casings from regenerated cellulose for these products, the problem of casing adherence has become formidable.

The "artificial casing" (so-called to distinguish it from natural animal casings) must be permeable to allow the smoke particles to penetrate and also allow moisture and juices from the heated meat to escape. It should also, to some degree, be capable of shrinking so that a tight package will result. During the heating period in the smoke house, the release of juices from the meat and subsequent surface dehydration causes the casing to adhere to the meat surface. This is particularly true of those surfaces having little or no natural fat covering. Not only does the sticking of casings to the enclosed meat cause inconvenience for the consumer, but, in addition, a meat product from which the casing has been forcibly stripped is frequently found to have a poor surface appearance.

It is therefore an object of the present invention to provide a coating for meat products, such as primal cuts, which will prevent adherence of the meat to artificial casings in which it is enclosed.

Another object of this invention is to provide meat product which can be readily removed from an artificial casing without the consequent deleterious effects on surface appearance when the casing is removed from the meat.

A further object of the invention is to extend the applicability of artificial casings, without creating the problems which attend the adherence of meat to its casing to a variety of processed meat products which have only a partial natural fat covering, or none at all.

Additional objects if not specifically set forth herein will be readily apparent to those skilled in the art from the following description of the invention.

Generally, the present invention contemplates the application of an acetylated glyceride coating to whole cuts of meat, such as primal meat products, which are to be enclosed and processed in artificial casings as a means for assuring the free separation of meat and casing in the hands of the consumer. To accomplish this purpose, the meat product is sprayed, brushed or dipped in the material, or applied in any other convenient manner, the coated product then being enclosed in the casing and subjected to conventional smoking and heating procedures. Material applied in quantities of from about 0.2% to 1.0% by weight of meat product have proved satisfactory.

More particularly, this invention embraces the use of approximately 0.6% by weight of acetylated monoglycerides, diglycerides or mixtures thereof applied as a coating prior to enclosure of the meat in an artificial casing and exposure to the smoking and heating operation. Soybean oil has been found admirably suited as a glyceride source when its acetylated monoglycerides are applied in amounts approximating 0.3% to 0.8% by weight.

The coating of meat products as described appears to fulfill the same function as a natural fat covering in preventing the adherence of the casing to the meat surface subsequent to processing. These coatings are relatively insoluble in the lean meat substance and are not absorbed to any great degree, properties which are important from the standpoint of providing a coating material which will remain on the surface over extended periods. Moreover, meat products coated in accordance with the present invention may be stored at customary refrigeration temperatures without development thereon of a hard surface film, owing to the low solidification point of the acetylated glycerides. It may be said that these acetylated monoglycerides and diglycerides are inert both with respect to the meat and to the casing, being without discernible influence on the taste and appearance of the product enclosed.

The invention will be more fully understood from the examples which follow:

*Example I*

A cured boneless ham having a normal fat covering was coated with partially acetylated monoglycerides of soybean oil in amounts of approximately 0.3% by weight of ham. The product was then enclosed in an artificial casing, placed in a mesh bag and processed as a fully cooked product in a smokehouse having ambient temperatures of 165–170° F. to give internal temperatures in the product of 148–152° F. After processing, the product was held in a cooler at 26–28° F. for a period of seven days. It was found there was no adherence of the casing to the ham, even where the natural fat covering was negligible or non-existent. The casing was easily removed from the ham and the surface appearance was uniformly satisfactory.

*Example II*

A cured boneless veal leg was coated with partially acetylated monoglycerides of soybean oil in amounts of approximately 0.6% by weight. The product was then enclosed in an artificial casing, placed in a mesh bag and hung in the smokehouse for smoke and heat processing as a fully cooked item. At the conclusion of this treatment, the encased product was removed from the mesh bag and kept in a refrigerator at temperatures of 34° F. to 36° F. for a period of 7 days. It was found that there was no adherence of the casing to the meat surface such as to require forcible stripping and that the surface appearance of the meat after removal was uniformly satisfactory.

The method herein disclosed has been found applicable to whole cuts of meat which are normally enclosed in artificial casings. In particular may be mentioned picnics, boneless shoulder rolls, Canadian backs, boneless ham rolls and the like as being adapted to the practice of the present invention. Such products as are subjected to sufficient heat to induce migration of meat juices to the surface represent the area in which the results are most striking because it is here that the greatest difficulties are normally encountered. Quite obviously, however, these coatings are equally well suited to serve as anti-sticking agents in any analogous service wherein the enclosing material is non-protein in nature, such as regenerated cellulose.

Other oils which might be used in the practice of this invention are the partially acetylated monoglycerides (as commercially known) of cottonseed oil, winterized cottonseed oil, peanut oil, corn oil, lard oil, prime steam lard, and other fats and oils of relatively comparable saturation. The glyceride compounds to which reference is made may be prepared by standard acetylation procedures, such as that described by R. O. Feuge, et al. in the Journal of the American Oil Chemists Society, volume 29, pages 11-14; ibid., volume 30, pages 283-287. Commercial monoglycerides contain mixtures of monoglycerides and diglycerides.

The triglyceride oils are, generally, unsuitable as coating materials because of their higher solubility in the meat and natural fat content thereof. However, their influence in this regard is proportional to their concentration in the coating mixture, and hence their presence cannot be said automatically to render the coating unsatisfactory.

Throughout the foregoing description and the claims which follow, the terms "monoglycerides" and "diglycerides" are to be construed as including both partially and completely acetylated compounds.

Many modifications and variations of the invention as hereinbefore set forth may be made without departing from its spirit and scope, and therefore only such limitations should be imposed as are indicated in the appended claims.

We claim:

1. The method of preventing adherence of artificial casings to cured boneless meat products enclosed therein which comprises: coating a boneless cured meat product with a material selected from the group consisting of acetylated monoglycerides, acetylated diglycerides and mixtures thereof in amounts of at least 0.2 percent by weight; enclosing said meat product in a permeable artificial casing; and heating said meat product to suitable cooking temperatures.

2. The method of claim 1 wherein the coating material is applied to the meat product by spraying.

3. The method of preventing adherence of artificial casings to cured boneless meat products enclosed therein which comprises: coating a boneless cured meat product with a material selected from the group consisting of acetylated monoglycerides, acetylated diglycerides and mixtures thereof in amounts of at least 0.2 percent by weight; thereafter enclosing said meat products in a permeable artificial casing; subjecting said meat products to smoke and heating said meat product to suitable cooking temperatures.

References Cited in the file of this patent

UNITED STATES PATENTS

| | | |
|---|---|---|
| 2,685,521 | Edgar | Aug. 3, 1954 |
| 2,709,138 | Weingland et al. | May 24, 1955 |
| 2,808,421 | Brokaw | Oct. 1, 1957 |

FOREIGN PATENTS

| | | |
|---|---|---|
| 404,871 | Great Britain | Jan. 25, 1934 |